United States Patent
Kawauchi et al.

(10) Patent No.: US 7,126,262 B2
(45) Date of Patent: Oct. 24, 2006

(54) PIEZOELECTRIC VIBRATION GYRO ELEMENT, METHOD FOR MANUFACTURING THE SAME, AND PIEZOELECTRIC VIBRATION GYRO SENSOR

(75) Inventors: Osamu Kawauchi, Shiojiri (JP); Koji Watanabe, Ina (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 10/852,606

(22) Filed: May 25, 2004

(65) Prior Publication Data

US 2005/0006988 A1 Jan. 13, 2005

(30) Foreign Application Priority Data

Jun. 4, 2003 (JP) ............................. 2003-159720
Mar. 26, 2004 (JP) ............................. 2004-093764

(51) Int. Cl.
*G01C 19/56* (2006.01)
(52) U.S. Cl. ...................... 310/367; 434/186; 74/5.6 D; 74/5 R
(58) Field of Classification Search ................ 310/367; 74/5 R–5.95; 434/186
See application file for complete search history.

(56) References Cited

U.S. PATENT DOCUMENTS

| 6,747,393 | B1 * | 6/2004 | Kikuchi et al. | ............. 310/321 |
| 2003/0084723 | A1 * | 5/2003 | Kikuchi et al. | ............ 73/504.12 |
| 2004/0145281 | A1 * | 7/2004 | Kikuchi et al. | ............. 310/367 |

FOREIGN PATENT DOCUMENTS

| JP | 54-029596 | 3/1979 |
| JP | 59-104813 | 6/1984 |
| JP | A-07-055479 | 3/1995 |
| JP | 08-023249 | 1/1996 |
| JP | A-2001-012952 | 1/2001 |
| JP | A-2003-166828 | 6/2003 |
| JP | A-2003-218657 | 7/2003 |

* cited by examiner

Primary Examiner—Darren Schuberg
Assistant Examiner—J. Aguirrechea
(74) Attorney, Agent, or Firm—Oliff & Berridge, PLC

(57) ABSTRACT

The invention provides a piezoelectric vibration gyro element including a pair of detecting resonant arms at its center, connecting arms each on, the right and left of the center, and a pair of driving resonant arms at each far end of the connecting arms, which makes it possible to secure the symmetry of the resonant arms' flexure and vibrating, and easily and accurately separate electrodes. In particular, two side surfaces of extension parts that extend along the direction in which each end surface of connecting arms extends, flat surfaces are provided to both sides in a direction perpendicular to the direction in which driving resonant arms extend. A wiring passing across the end surface of the extension parts in its thickness direction and joining front and back main surfaces of the end surface of the connecting arms and the extension parts can be formed so as to electrically couple the first driving electrodes each on the front and back main surfaces of the driving resonant arms. The exposure for electrode separation can be done from the above in a direction perpendicular to the flat surface of the extension part and with a given angle to the main surfaces of the driving resonant arms so as to simultaneously expose the main surfaces and side surfaces to light.

9 Claims, 14 Drawing Sheets

[FIG. 1]
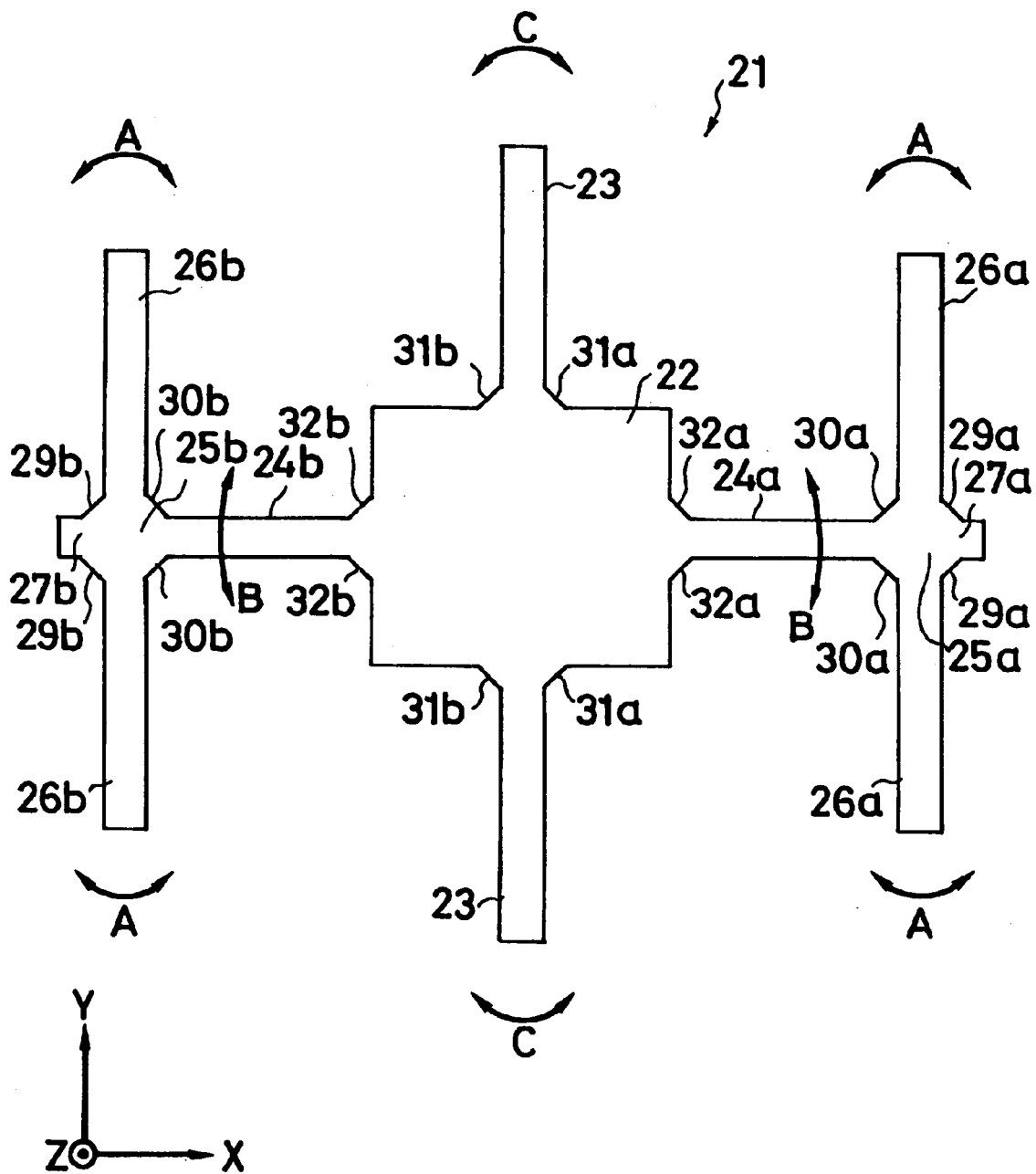

[FIG. 2a]
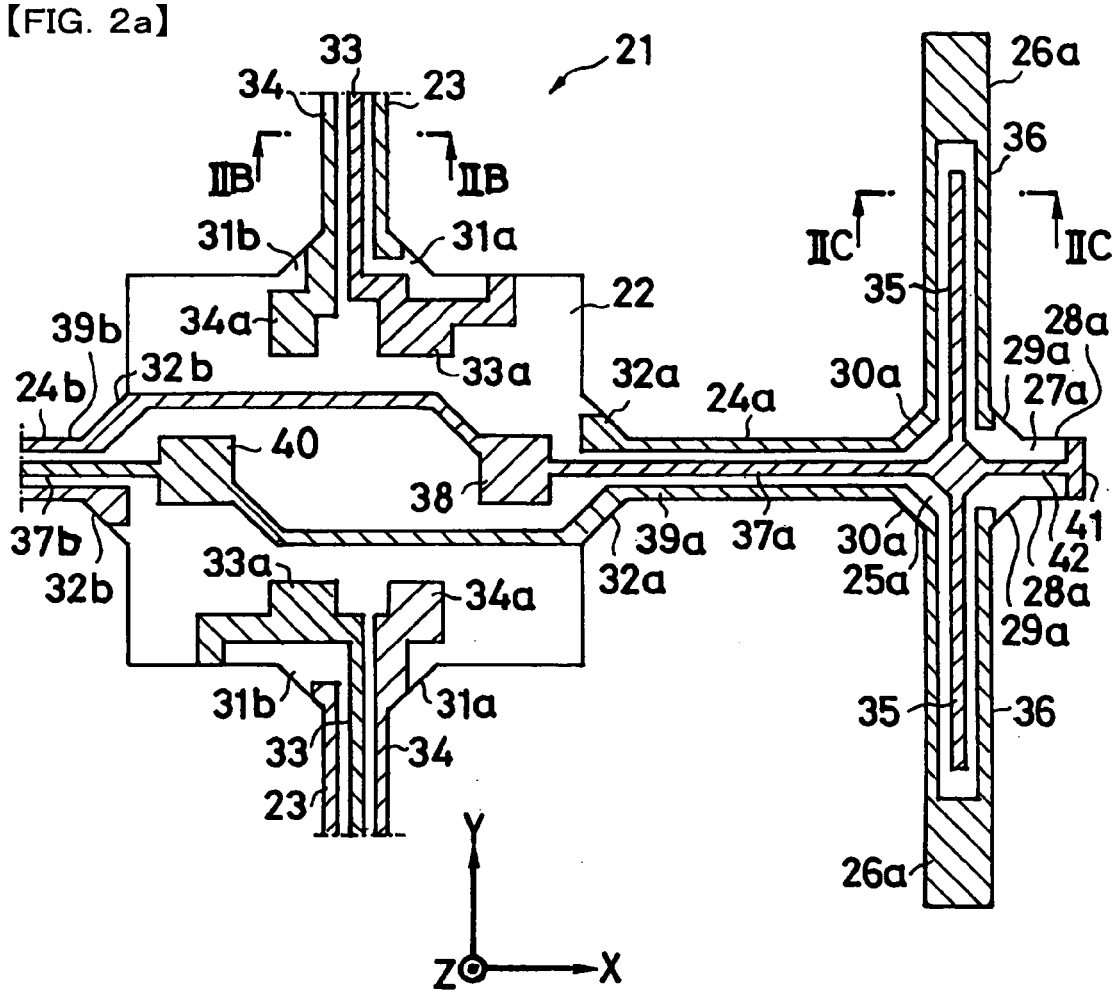
[FIG. 2b]
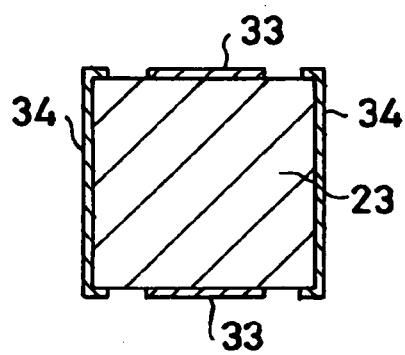
(C)
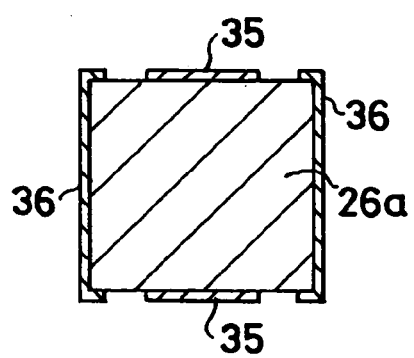

[FIG. 3]
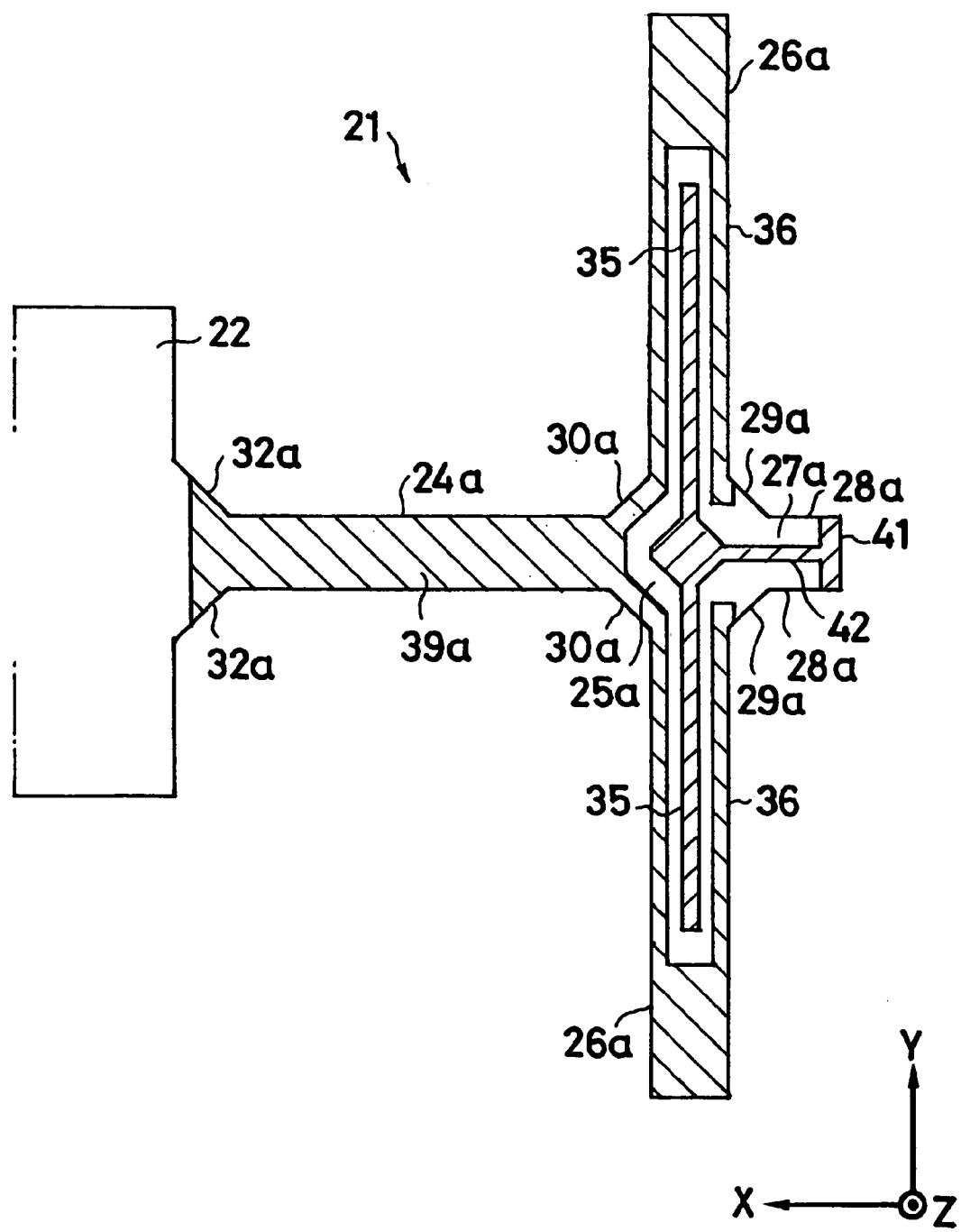

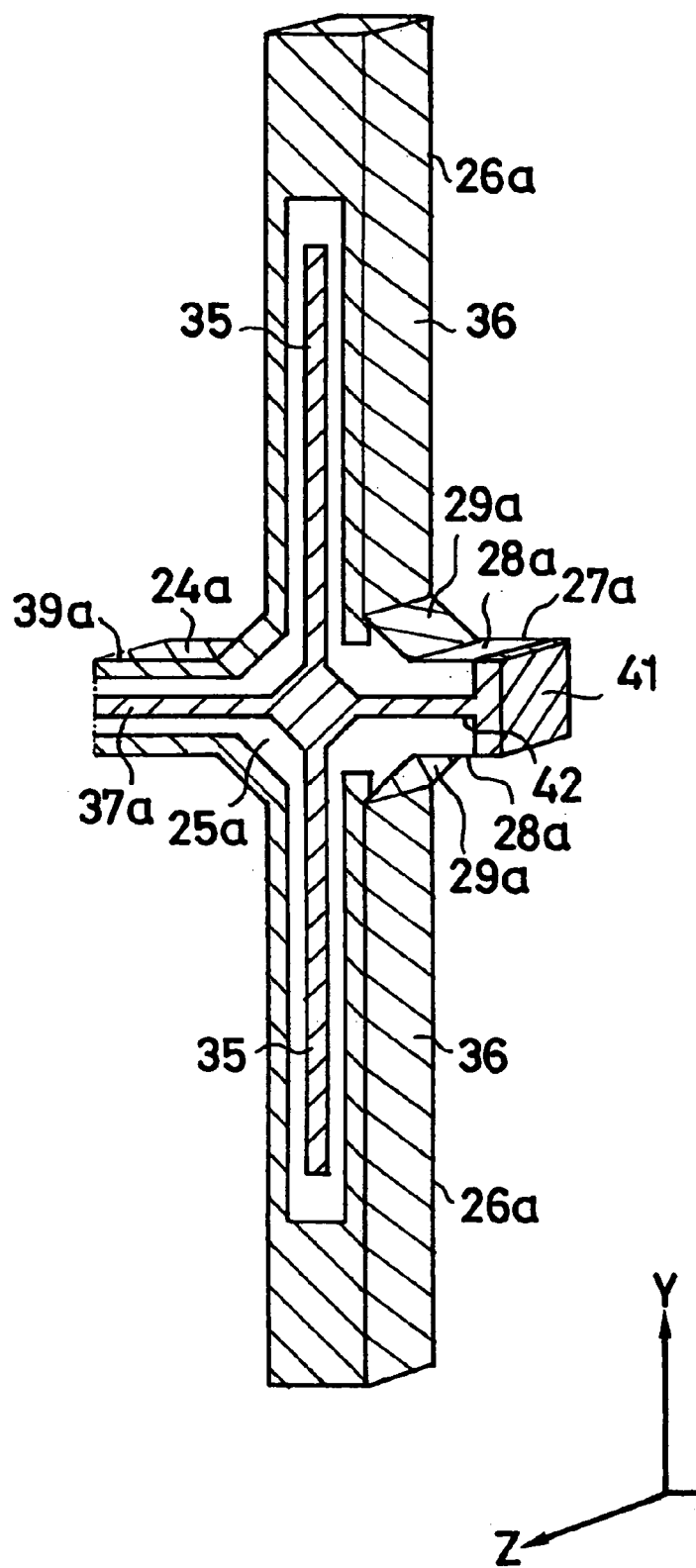
[FIG. 4]

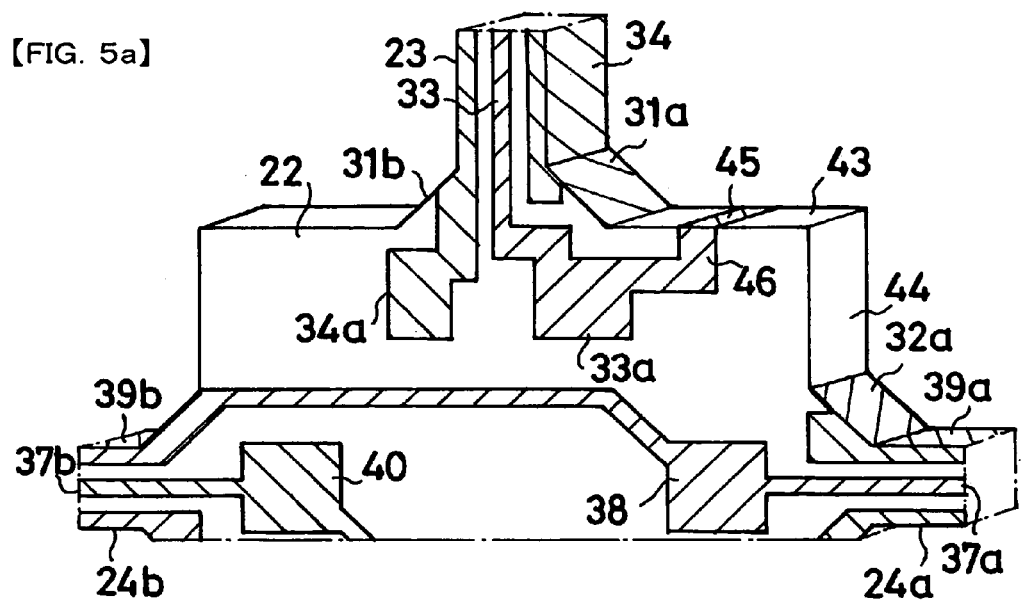
[FIG. 5a]
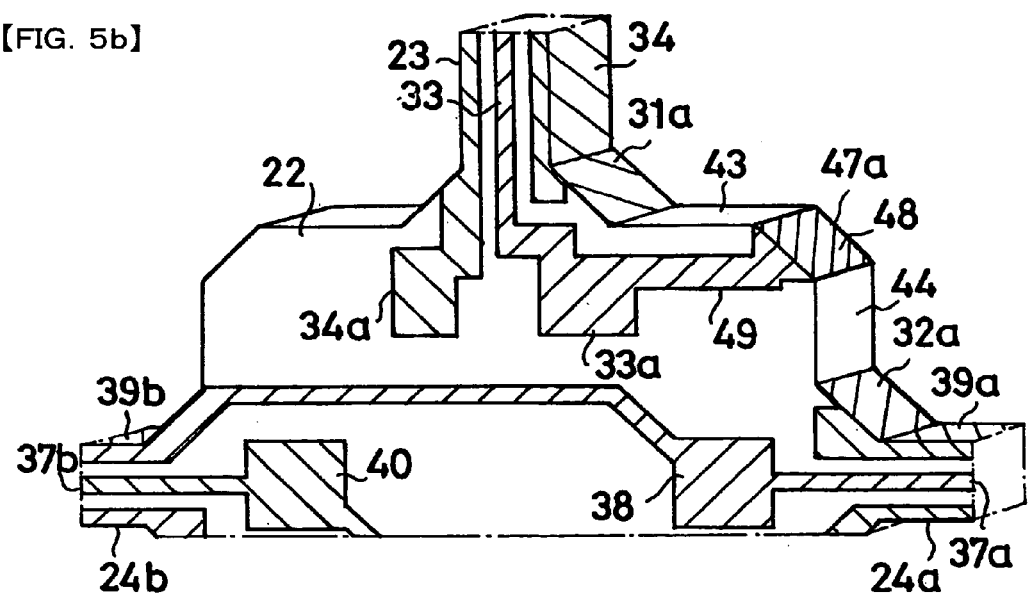
[FIG. 5b]

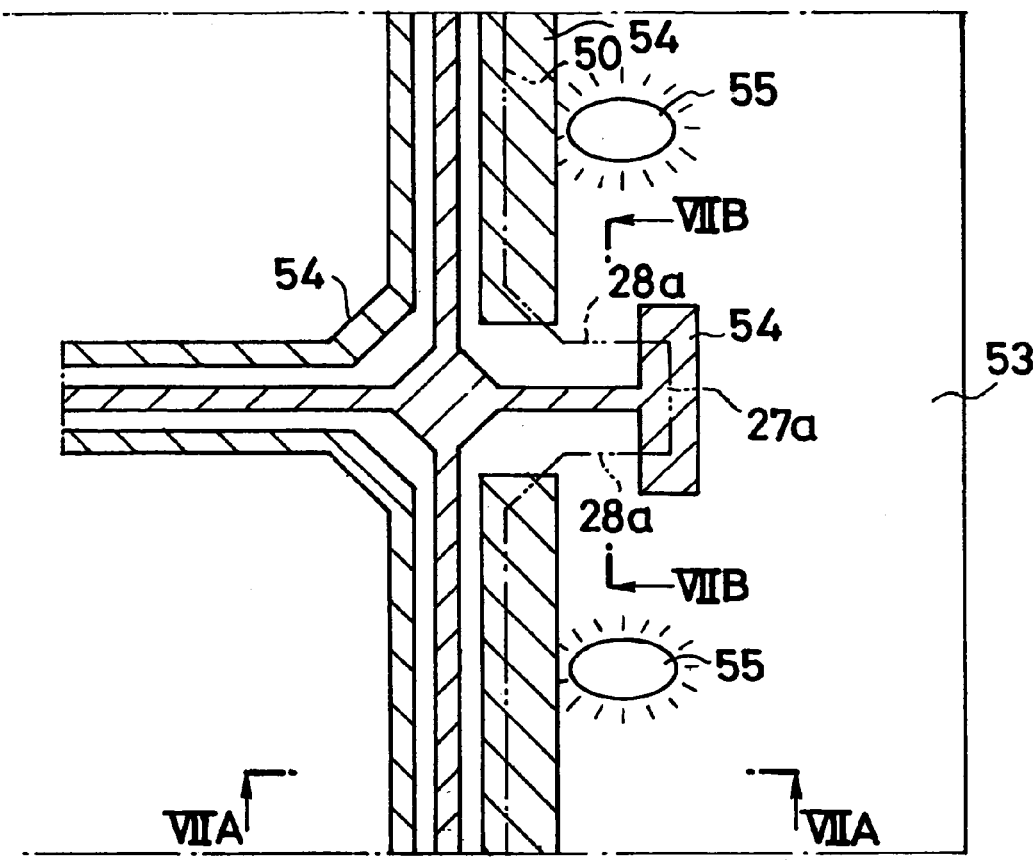
[FIG. 6]

[FIG. 7a]
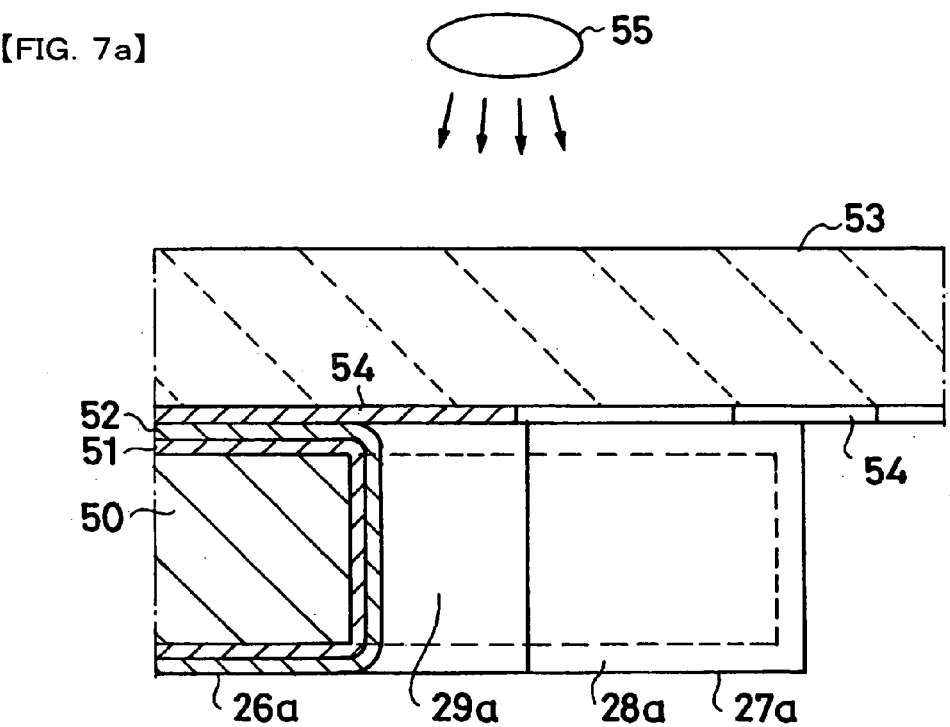
[FIG. 7b]
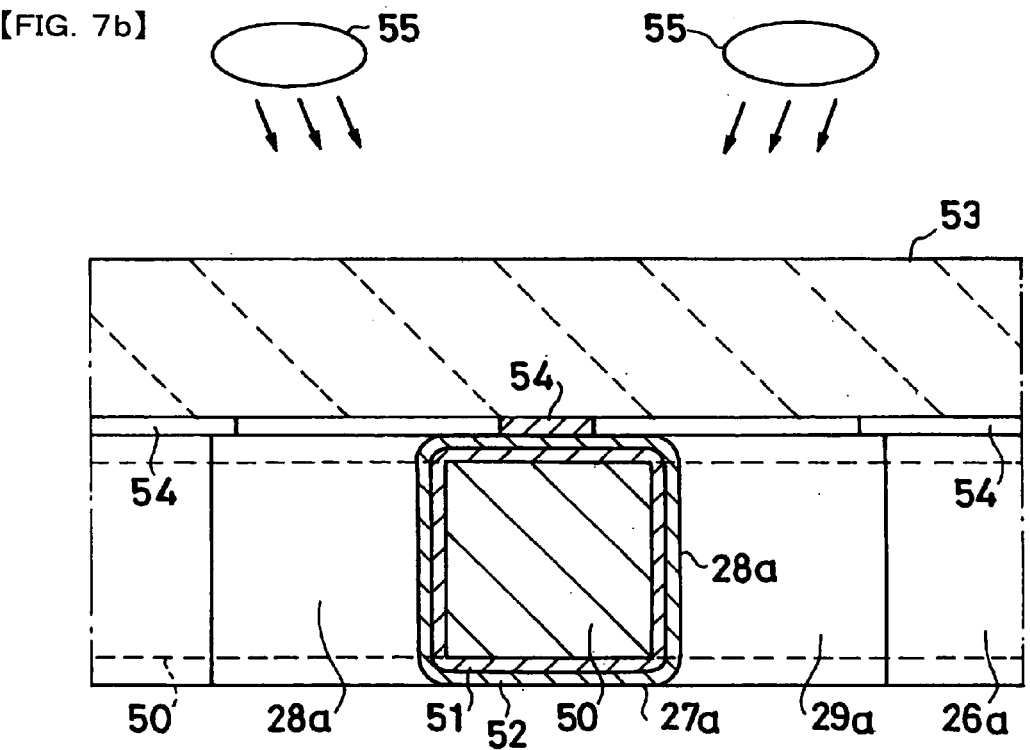

[FIG. 8a]
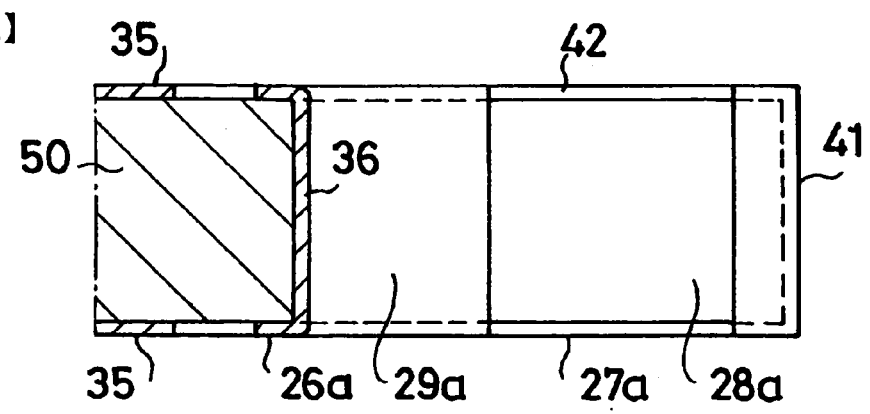
[FIG. 8b]
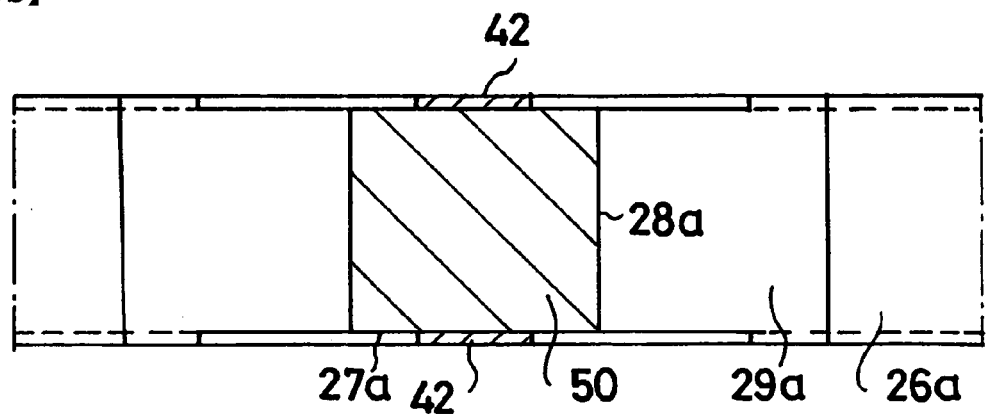

[FIG. 9a]
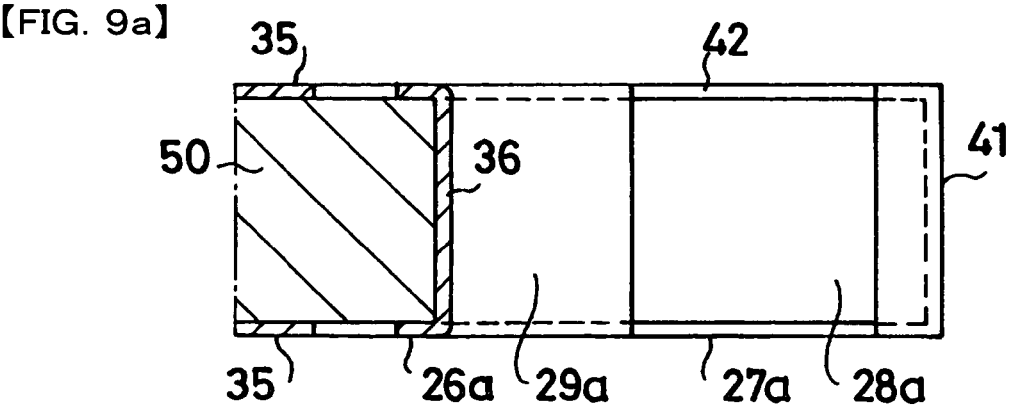
[FIG. 9b]
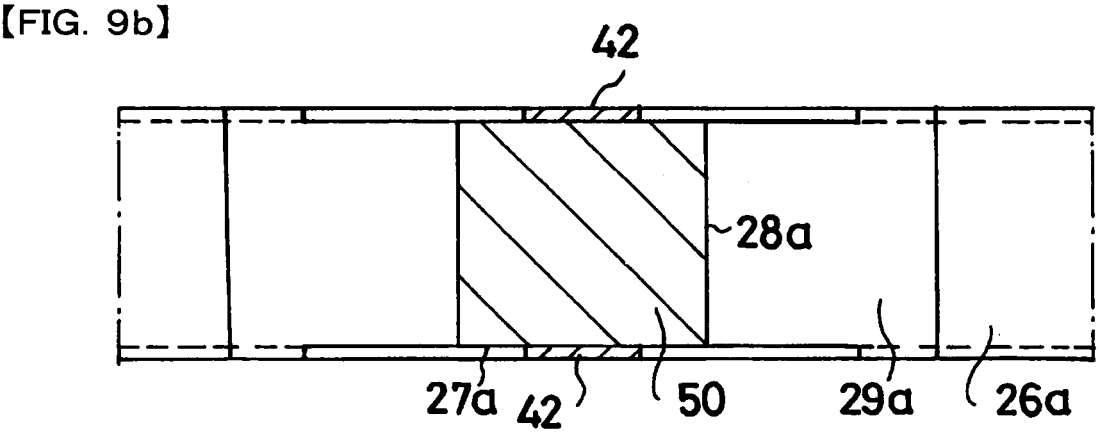

[FIG. 10]
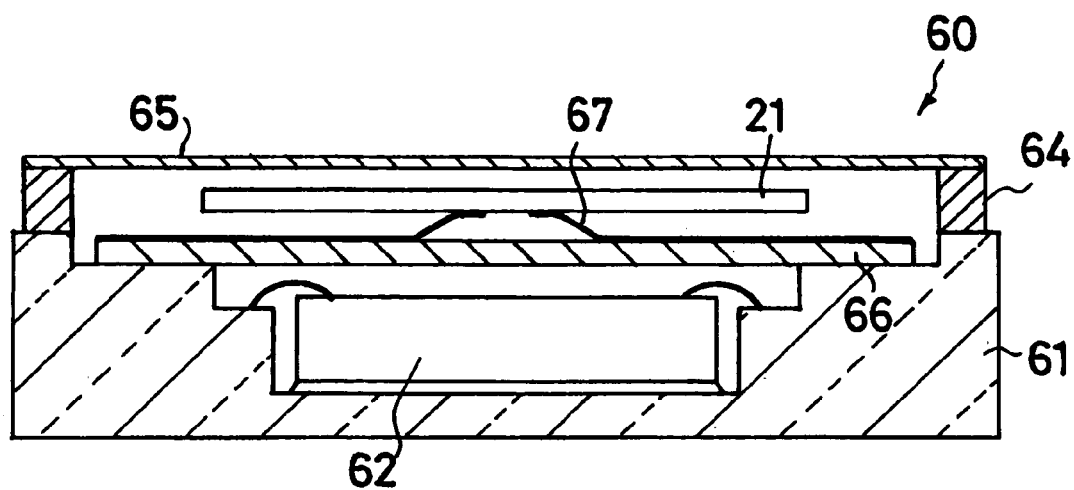

[FIG. 13]
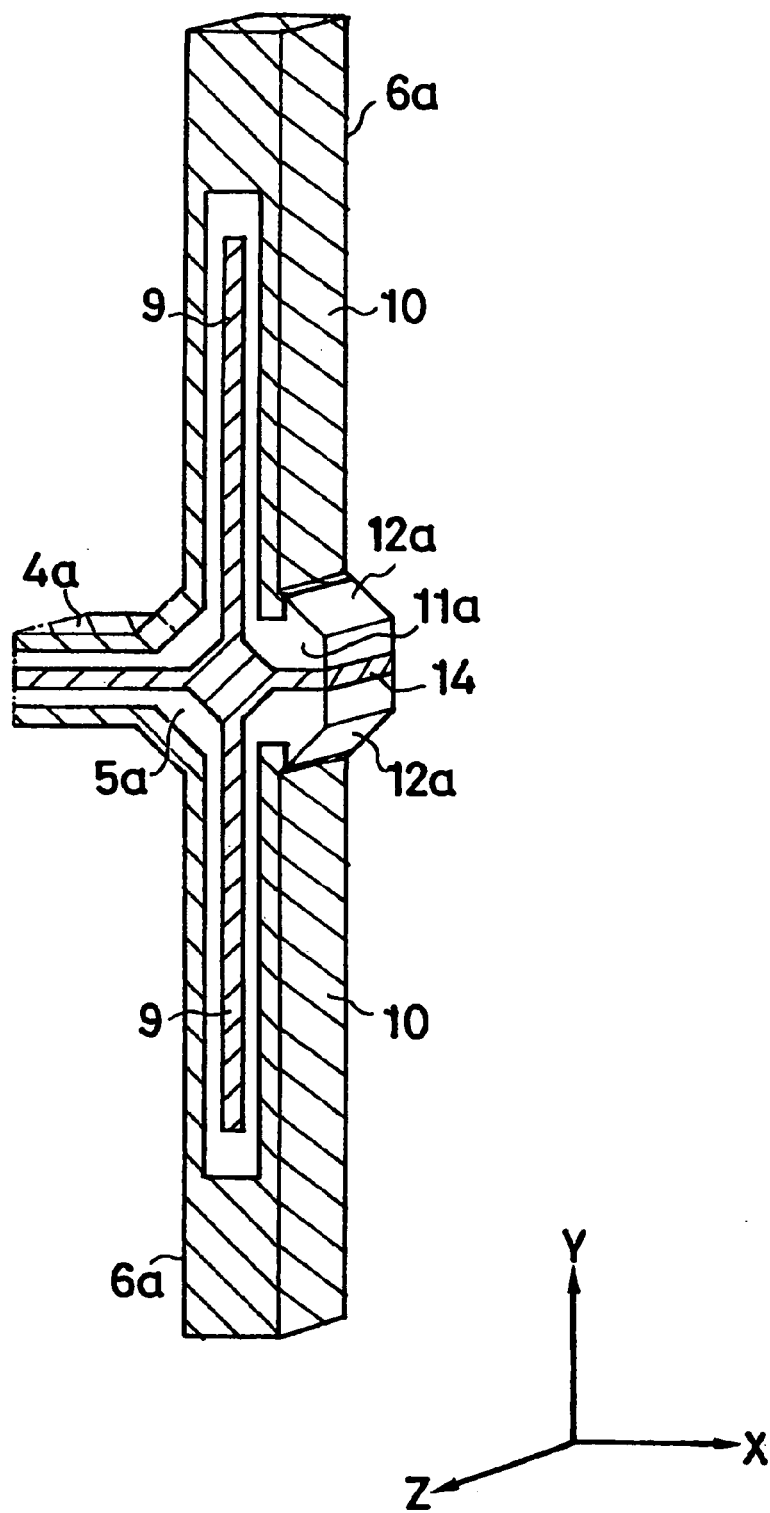

[FIG. 14a]
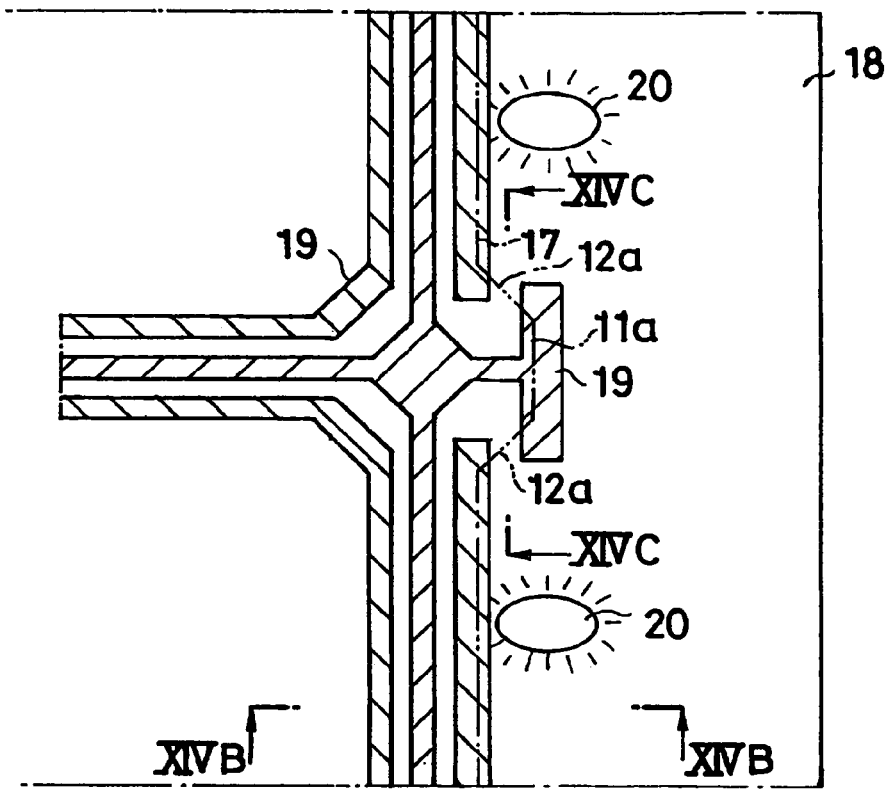
[FIG. 14b]
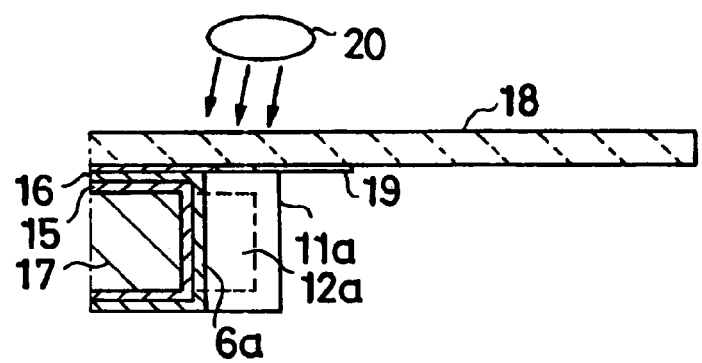
[FIG. 14c]
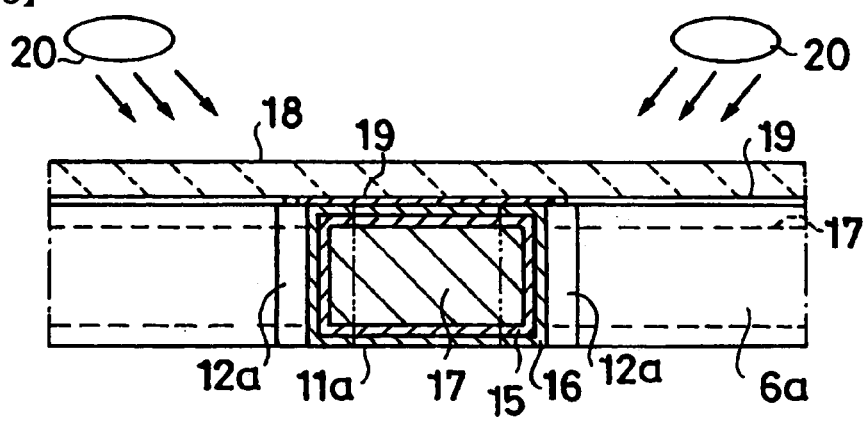

PIEZOELECTRIC VIBRATION GYRO ELEMENT, METHOD FOR MANUFACTURING THE SAME, AND PIEZOELECTRIC VIBRATION GYRO SENSOR

BACKGROUND OF THE INVENTION

1. Field of Invention

The invention relates to a piezoelectric vibration gyro element including a driving resonant arm and a detecting resonant arm, a method for manufacturing the same, and a piezoelectric vibration gyro sensor using the same.

2. Description of Related Art

Piezoelectric vibration gyroscopes have been widely used in a rotation angle velocity sensor for ship, aircraft, automobile attitude control and navigation systems and the sensor for detecting and preventing the movement of camcorders, and in a rotation direction sensor for three-dimensional mice. Various configuration types have been proposed for serving as such piezoelectric vibration gyroscopes. Examples of these include rotation velocity sensors having fork-shaped parts on both sides (e.g., Japanese Unexamined Patent Application Publication No. 7-55479), and so-called double T-shaped piezoelectric resonators having substantially T-shaped driving resonant systems laid out symmetrically about a central detecting resonant system (e.g., Japanese Unexamined Patent Application Publication No. 2003-166828 and Japanese Unexamined Patent Application Publication No. 2001-12952).

FIGS. 11(A) through (C) show an example of a double T-shaped piezoelectric vibration gyro element. As shown in FIG. 11(A), a piezoelectric vibration gyro element 1 is laid out horizontally. The piezoelectric vibration gyro element 1 can include a pair of detecting resonant arms 3, 3, a pair of connecting arms 4a, 4b, and right and left pairs of driving resonant arms 6a, 6a, 6b, 6b. The detecting resonant arms 3, 3 extend from a central supporting part 2 upward and downward in the drawing. The connecting arms 4a, 4b extend from the central supporting part 2 to the right and left in the drawing in a direction perpendicular to the detecting resonant arms. The driving resonant arms 6a, 6a, 6b, 6b extend from bases 5a, 5b, which are the far ends of the connecting arms, upward and downward in the drawing in parallel with the detecting resonant arms.

As shown in FIG. 11(B), each of the detecting resonant arms is provided with a first detecting electrode 7 and a second detecting electrode 8 on its front and back main surfaces and both sides, respectively. As shown in FIG. 11(C), each of the driving resonant arms is provided with a first driving electrode 9 and a second driving electrode 10 on its front and back main surfaces and both sides, respectively.

When applying alternating current to the driving electrodes via an electrode pad above the central supporting part 2, the driving resonant arms 6a, 6a, 6b, 6b flexural vibrate in the XY plane including their main surfaces in the direction indicated by arrows. When the piezoelectric vibration gyro element 1 rotates in the XY plane, i.e., around the Z axis, in this state, the Coriolis force arises along the longitudinal direction of the driving resonant arms back and forth alternately, making the connecting arms 4a, 4b also flexural vibrate in the XY plane in the direction indicated by arrows. The force is transmitted via the central supporting part 2, and thereby making the detecting resonant arms 3, 3 also flex and vibrate in the XY plane in the direction indicated by arrows. The detecting electrodes detect the distortion of piezoelectric material due to the detecting resonant arms' flexure and vibrating and generate a signal. By electrically processing the signal, the rotation and angle velocity in the plane around the Z axis are measured.

Japanese Unexamined Patent Application Publication No. 2001-12952 also discloses the following configuration of such a double T-shaped piezoelectric resonator. According to the document, extension parts 11a, 11b are provided to the end of a supporting part (corresponding to the bases 5a, 5b referring to the ends of the connecting arms 4a, 4b in FIG. 11(A)), toward the extension of the supporting part (corresponding to the connecting arms 4a, 4b) as indicated by imaginary lines in FIG. 11(A). Also, tapered parts 12a, 12a, 12b, 12b are provided on each side surface of the extension parts 11a, 11b adjacent to the driving resonant arms, like at the base of each detecting resonant arm and of each connecting arm extending from the central supporting part 2, and each junction between the driving resonant arm and the connecting arm. These extension parts and tapered parts enhances the symmetry of the driving resonant arms' flexure and vibrating, and thereby reducing variations in the vibration state due to temperature fluctuations. This eventually reduces resonance frequency drift resulting from the ambient temperature.

FIG. 12 shows one of the driving resonant arms 6a, 6b included in a double T-shaped configuration. Typically, the first driving electrodes 9, 9 formed on the front and back main surfaces are coupled each other with an electrode film 13 provided at the end of the connecting arm 4a (4b) therebetween. Meanwhile, the second driving electrodes 10, 10 and the electrode film 13 are separated on the side surface of the driving resonant arm 6a (6b) and the end surface of the connecting arm 4a (4b), i.e., the side surface of the base 5a (5b), all of which are on the same plane.

Various methods have been proposed in order to separate electrodes on the side surface of such a piezoelectric resonator. Example of these include a method for providing an electrode film on the surface of a tuning fork-shaped thin crystal plate and then mechanically cutting off a projection provided at the part of separation of side electrodes in advance, and a method for partly removing such an electrode film by irradiating a portion of separation of side electrodes with a laser (e.g., Japanese Unexamined Patent Application Publication No. 54-29596). Another example is a method for exposing recessed parts provided to a part of separation of side electrodes in such a piezoelectric resonator to perpendicular light and then etching a conductive thin film in the recessed parts in order to separate the side electrodes (e.g., Japanese Unexamined Patent Application Publication No. 59-104813). Also, the same can be achieved by a method for forming an electrode film on the front and back main surfaces and side surfaces of a crystal element by means of vacuum deposition using a deposition mask having a window for electrode patterning (e.g., Japanese Unexamined Patent Application Publication No. 8-23249).

An alternative method is forming an electrode film on the whole surface of a shaped piezoelectric resonator, depositing a photoresist film on the electrode film, exposing the film by using masks for electrode patterning, and then wet etching the electrode film, so as to form electrodes and provide a wiring on the front and back main surfaces and side surfaces of the piezoelectric resonator (e.g., Japanese Unexamined Patent Application Publication No. 2003-218657). In separating side electrodes using photo etching, the front and back main surfaces and side surfaces can be separately exposed using different exposure masks or exposed all at once from the above in an oblique direction using a single exposure mask (see, Japanese Unexamined Patent Application Publication No. 59-104813 and Japanese Unexamined Patent Application Publication No. 2003-218657). While it becomes comparatively difficult to separate side electrodes with smaller piezoelectric resonators according to the above mentioned methods disclosed in Japanese Unexamined Patent Application Publication No. 54-29596 and Japanese Unexamined Patent Application Publication No. 8-23249 as the trend toward compact equipment develops, the separation of side electrodes using photo etching has an advantage of providing a solution to smaller piezoelectric resonators.

SUMMARY OF THE INVENTION

As for a double T-shaped piezoelectric resonator with such a configuration that the side surface of the driving resonant arm 6a (6b) and the end surface of the connecting arm 4a (4b) are on the same plane as shown in FIG. 12, it is comparatively easy to separate the second driving electrodes 10, 10 from the electrode film 13 by conventional photo etching as mentioned above. A configuration with the extension parts 11a, 11b that are tapered at the end of the connecting arms 4a, 4b as described referring to FIG. 11(A), however, involves the following problems in separating side electrodes.

In a piezoelectric resonator with such a configuration, as shown in FIG. 13, the first driving electrodes 9, 9 provided on the front and back main surfaces are coupled each other by a wiring including an electrode film 14 at its end joining the front and back main surfaces of the extension part 11a (11b) like the one shown in FIG. 12. Here, the second driving electrodes 10, 10 and the electrode film 14 on the side surface of the driving resonant arm are separated by wet etching and removing an electrode film provided on the tapered part 12a (12b).

In an exposure process for making an electrode and wiring pattern, an exposure mask 18 is placed on a piezoelectric element piece 17, as shown in FIGS. 14(A) through (C). On the whole surface of the piezoelectric element piece 17, an electrode film 15 is provided. Further on the electrode film 15, a photoresist film 16 is applied. The exposure mask 18 is formed by depositing a metal film made of chrome, for example, on the surface of a thin transparent glass plate so as to have a light-shielding part 19 for electrode and wiring patterning. The exposure mask 18 is irradiated with ultraviolet light from the above in an oblique direction toward the piezoelectric element piece 17 using a light source 20 positioned above the mask 18, so that the main surface and side surfaces of the element piece are exposed to the light all at once.

As shown in FIG. 14(B), the exposure from the above in an oblique direction makes it possible to irradiate not only the main surface of the driving resonant arm 6a (6b), but also its side surfaces and other faces in parallel with them with light at nearly right angles. Therefore, the photoresist film 16 on the side surface of the driving resonant arm is accurately exposed with the sufficient amount of exposure in a single step of the exposure process. On the tapered parts 12a, 12a (12b, 12b) of the extension part 11a (11b), however, the angle of light radiation is lower, since the side surface of the driving resonant arm is tapered. As a result, the tapered parts 12a, 12a (12b, 12b) are not sufficiently exposed to light. In the worst scenario, the photoresist film 16 remains unremoved and prevents the electrode film 15 from being appropriately etched, and thereby causing a short circuit between the second driving electrodes 10, 10 and the electrode film 12.

When using a crystal piezoelectric element piece in particular, a projection called a fin is get formed as a result of processing the shape of the piece by wet etching. Here, in order to sufficiently expose the side surface of the crystal element to light, it is necessary to precisely set the angle of light radiation. On the tapered parts 12a, 12b, however, since the angle of light radiation is lower as mentioned above, some portions are interrupted by the fin and insufficiently or never exposed to light. Consequently, it is highly possible that part of the electrode film 15 remains unetched on one hand.

On the other hand, if the light radiation is increased or carried out for a longer time in order to increase the exposure amount of the tapered parts, this may result in excess exposure on the surfaces other than the tapered parts and adversely affect accurate patterning of the photoresist film 16. Here, it is possible to expose the tapered parts separately from the other portions, but this requires an exposure mask and process exclusively for the tapered parts. This increases work loads and processes for changing the position of the light source and accurately aligning the masks, for example, which may lower productivity and yield.

The invention aims to provide a so-called double T-shaped piezoelectric vibration gyro element including a pair of detecting resonant arms extending to both sides from a central supporting part, a pair of connecting arms extending to both sides from the central supporting part in a direction perpendicular to the detecting resonant arms, right and left pairs of driving resonant arms extending to both sides from the far ends of the connecting arms in a direction perpendicular to the connecting arms, and extension parts projecting from the far ends of the connecting arms. The piezoelectric vibration gyro element is capable of providing a solution to compact devices, securing each resonant arm's symmetrical flexure and vibrating, and accurately separating electrodes.

The invention also aims to provide a method for manufacturing, such a piezoelectric vibration gyro element that is capable of simplifying a process for separating electrodes by photo etching in particular, improving productivity and yield, and reducing manufacturing cost.

Furthermore, the invention aims to provide a highly reliable piezoelectric vibration gyro sensor that is capable of securing each resonant arm's symmetrical flexure and vibrating, and preventing a short circuit of driving electrodes on the side of the driving resonant arms in particular.

A piezoelectric vibration gyro element according to the invention can include a pair of detecting resonant arms extending from a central supporting part to both sides and including first detecting electrodes each on front and back main surfaces and second detecting electrodes each on side surfaces, a pair of connecting arms extending from the central supporting part to both sides in a direction perpendicular to the detecting resonant arms, two pairs of driving resonant arms extending from each far end of the connecting arms to both sides in a direction perpendicular to the connecting arms and including first driving electrodes each on front and back main surfaces and second driving electrodes each on side surfaces, an extension part extending from each far end of the connecting arms in a direction in which each of the connecting arms extends, and a flat surface included in side surfaces of the extension part extending to both sides along a direction in which an end surface of the extension part extends and perpendicular to a direction in which the driving resonant arms extend. The first driving electrodes on the front and back main surfaces of the driving resonant arms are electrically coupled each other by a wiring pattern passing across the end surface of the extension part in a thickness direction and joining the end surface and front and back main surfaces of the extension part.

By providing each of the connecting arms with the extension part, the symmetry of the driving resonant arms' flexure and vibrating can be secured. In addition, since the flat surface on the side surfaces of the extension part extends in the direction perpendicular to the direction in which the driving resonant arms extend, it is possible to evenly expose the main surfaces and side surfaces of the piezoelectric vibration gyro element to light for its electrode separation by means of photo etching, and to form an electrode and wiring pattern with highly accurate dimensions and shapes. This makes it possible to accurately remove the electrode film from the flat surface. Therefore, the wiring pattern joining the first driving electrodes each on the front and back main surfaces of the driving resonant arms is completely separated from the second driving electrodes each on the side surfaces of the driving resonant arms, so that no short circuit will occur. The invention thus makes it possible to secure the symmetry of the resonant arms' flexure and vibrating and to accurately separate electrodes, as well as provides a solution to smaller piezoelectric vibration gyro element.

In the piezoelectric vibration gyro element according to an aspect of the invention, side surfaces of the central supporting part can have a first flat surface whose face is perpendicular to a direction in which the detecting resonant arms extend and a second flat surface whose face is in parallel with a direction in which the detecting resonant arms extend. The first detecting electrodes on the front and back main surfaces of the detecting resonant arms are electrically coupled each other by a wiring pattern passing across the first flat surface in a thickness direction and joining the front and back main surfaces of the central supporting part. The first flat surface of the central supporting part is evenly exposed to light like its main surfaces. Thus, an electrode and wiring pattern with highly accurate dimensions and shapes is formed. This makes it possible to accurately remove the electrode film from the first flat surface in a desired pattern like the flat surface of the extension part. Therefore, the wiring pattern joining the first detecting electrodes each on the front and back main surfaces of the detecting resonant arms is completely separated from the second detecting electrodes each on the side surfaces of the detecting resonant arms, so that no short circuit will occur.

In the piezoelectric vibration gyro element according to another aspect of the invention, side surfaces of the central supporting part can have a first flat surface whose face is perpendicular to a direction in which the detecting resonant arms extend, a second flat surface whose face is in parallel with a direction in which the detecting resonant arms extend, and a tapered part obliquely intersecting the first and second flat surfaces. The first detecting electrodes on the front and back main surfaces of the detecting resonant arms are electrically coupled to each other by a wiring pattern passing across the tapered part in a thickness direction and joining the front and back main surfaces of the central supporting part. While the tapered part is hard to be exposed to light by nature, the first and second flat surfaces are evenly exposed to light like the main surfaces. Therefore, it is possible to accurately remove the electrode film. Therefore, the wiring pattern joining the first detecting electrodes each on the front and back main surfaces of the detecting resonant arms is completely separated from the second detecting electrodes each on the side surfaces of the detecting resonant arms, so that no short circuit will occur.

In the piezoelectric vibration gyro element according to another aspect of the invention, a tapered part is provided to each far end of the connecting arms at each junction between the driving resonant arm and the connecting arm that are adjacent each other and between the driving resonant arm and the extension part that are adjacent each other, and a tapered part is also provided at each side surface of the central supporting part in which the detecting resonant arm and the connecting arm join. This makes it possible to secure the symmetry of the resonant arms' flexure and vibrating for the whole driving resonant and detecting resonant systems in the piezoelectric vibration gyro element.

The invention can also provide a method for manufacturing a piezoelectric vibration gyro element. The method can include the steps of forming an outer shape of an piezoelectric element piece including a pair of detecting resonant arms extending from a central supporting part to both sides, a pair of connecting arms extending from the central supporting part to both sides in a direction perpendicular to the detecting resonant arms, two pairs of driving resonant arms extending from each far end of the connecting arms to both sides in a direction perpendicular to the connecting arms, an extension part extending from each far end of the connecting arms in a direction in which each of the connecting arms extends, and a flat surface included in side surfaces of the extension part extending to both sides along a direction in which an end surface of the extension part extends and perpendicular to in a direction in which the driving resonant arms extend; forming an electrode film on whole surfaces of the piezoelectric element piece and applying a photoresist film on top of the electrode film; exposing the photoresist film to light from one main surface of the piezoelectric element piece and from the other main surface of the piezoelectric element piece. The method can further include removing the photoresist film that is exposed to light so as to expose the electrode film and removing the exposed electrode film by wet etching for electrode separation. Thus, the method forms first detecting electrodes each on front and back main surfaces of the detecting resonant arms and second detecting electrodes each on side surfaces of the detecting resonant arms, forms first driving electrodes each on front and back main surfaces of the driving resonant arms and second driving electrodes each on side surfaces of the driving resonant arms, removes the electrode film from the flat surface of the extension part, and provides the end surface and the extension part with a wiring pattern passing across the end surface of the extension part in a thickness direction and joining front and back main surfaces of the extension part so as to electrically couple the first driving electrodes each on the front and back main surfaces of the driving resonant arms.

By separating electrodes by photo etching, it is unnecessary to provide a exposure mask and process exclusively for a specific exposure region. Therefore, it is possible to simply manufacture the piezoelectric vibration gyro element according to the invention without increasing work loads and processes. This eventually improves productivity and yield, and reduces manufacturing cost. In particular, when using crystal, which has been widely used as a piezoelectric material, it is possible to accurately and easily form the outer shape of a piezoelectric element piece by wet etching a crystal wafer.

In the method for manufacturing a piezoelectric vibration gyro element according to another aspect of the invention, the exposure is done from the above in a direction perpendicular to the flat surface of the extension part, that is, a direction in which the extension part extends, and with a given angle to the main surfaces of the driving resonant arms. With the exposure from the above with an angle in this way, the front main surface and side surfaces of the piezoelectric element piece are exposed to light simultaneously and evenly. In particular, accurate exposure for necessary parts is achieved by irradiating the flat surface on the side surfaces of the extension part with substantially perpendicular light, making it possible to separate electrodes with highly accurate dimensions and shapes. Therefore, the wiring pattern joining the first driving electrodes each on the front and back main surfaces of the driving resonant arms is completely separated from the second driving electrodes each on the side surfaces of the driving resonant arms, so that no short circuit will occur.

In the method for manufacturing a piezoelectric vibration gyro element according to another aspect of the invention, side surfaces of the central supporting part of the piezoelectric element piece have a first flat surface whose face is perpendicular to a direction in which the detecting resonant arms extend and a second flat surface whose face is in parallel with a direction in which the detecting resonant arms extend, and the exposure is done from the above in a direction perpendicular to the first flat surface of the central supporting part and with a given angle to main surfaces of the central supporting part so as to remove the electrode film from the first and second flat surfaces and form a wiring pattern passing across the side surface of the central supporting part in a thickness direction and joining the front and back main surfaces of the central supporting part for electrically coupling the first detecting electrodes each on the front and back main surfaces of the detecting resonant arms. This makes it possible to expose the side surfaces of the central supporting part accurately for necessary portions, making it possible to separate electrodes with highly accurate dimensions and shapes. Therefore, the wiring pattern joining the first detecting electrodes each on the front and back main surfaces of the detecting resonant arms is completely separated from the second detecting electrodes each on the side surfaces of the detecting resonant arms, so that no short circuit will occur.

In the method for manufacturing a piezoelectric vibration gyro element according to another aspect of the invention, the photoresist film of the piezoelectric element piece is exposed to light from both front and back surfaces simultaneously, so that the photoresist film on the whole surfaces of the crystal element piece will be exposed to light in a single step of the exposure process.

The invention also economically provides a piezoelectric vibration gyro sensor. The piezoelectric vibration gyro sensor can include the piezoelectric vibration gyro element according to the invention, a semiconductor integrated circuit element for driving and controlling the piezoelectric vibration gyro element, and a package for containing the both. The piezoelectric vibration gyro sensor secures the symmetry of the resonant arms' flexure and vibrating, prevents a short circuit from occurring at the side surfaces of the driving resonant arms in particular, and provides highly reliable performance.

BRIEF DESCRIPTION OF THE DRAWINGS

The invention will be described with reference to the accompanying drawings, wherein like numerals reference like elements, and wherein:

FIG. 1 is a plan view schematically showing a piezoelectric vibration gyro element according to an embodiment of the invention;

FIG. 2(A) is a plan view showing driving resonant arms on one side including driving electrodes, detecting resonant arms including detecting electrodes, and a central supporting part including a wiring pattern of the piezoelectric vibration gyro element shown in FIG. 1, FIG. 2(B) is a sectional view along the line IIB—IIB in FIG. 2(A), and FIG. 2(C) is a sectional view along the line IIC—IIC in FIG. 2(A);

FIG. 3 is a partial plan view showing the back surface of the driving resonant arms and the driving electrodes shown in FIG. 2;

FIG. 4 is a partial perspective view showing the driving resonant arms and the driving electrodes shown in FIG. 2;

FIG. 5(A) is a partial perspective view showing the central supporting part and wiring pattern of the piezoelectric vibration gyro element shown in FIG. 1, and FIG. 5(B) is a perspective view showing part of the central supporting part like FIG. 5(A) with a modification;

FIG. 6 is a partial perspective view schematically showing an exposure process for providing the driving electrode to the driving resonant arm shown in FIG. 2;

FIG. 7(A) is a sectional view along the line VIIA—VIIA in FIG. 6. FIG. 7(B) is a sectional view along the line VIIB—VIIB in FIG. 6;

FIGS. 8(A) and (B) are sectional views like FIGS. 7(A) and (B) showing a step for stripping off photoresist;

FIGS. 9(A) and (B) are sectional views like FIGS. 8(A) and (B) showing a step for etching an electrode film;

FIG. 10 is a longitudinal sectional view of a piezoelectric vibration gyro sensor according to the invention;

FIG. 13 is a perspective view like FIG. 12 showing the driving electrode in the case where a tapered extension part is provided to a base of the driving resonant arms; and FIG. 14(A) is a partial plan view schematically showing an exposure process for providing the driving electrodes to the driving resonant arms shown in FIG. 13, FIG. 14(B) is a sectional view along the line XIVB—XIVB in FIG. 14(A), and FIG. 14(C) is a sectional view along the line XIVC—XIVC in FIG. 14(A).

DETAILED DESCRIPTION OF PREFERRED EMBODIMENTS

Figure 11A:
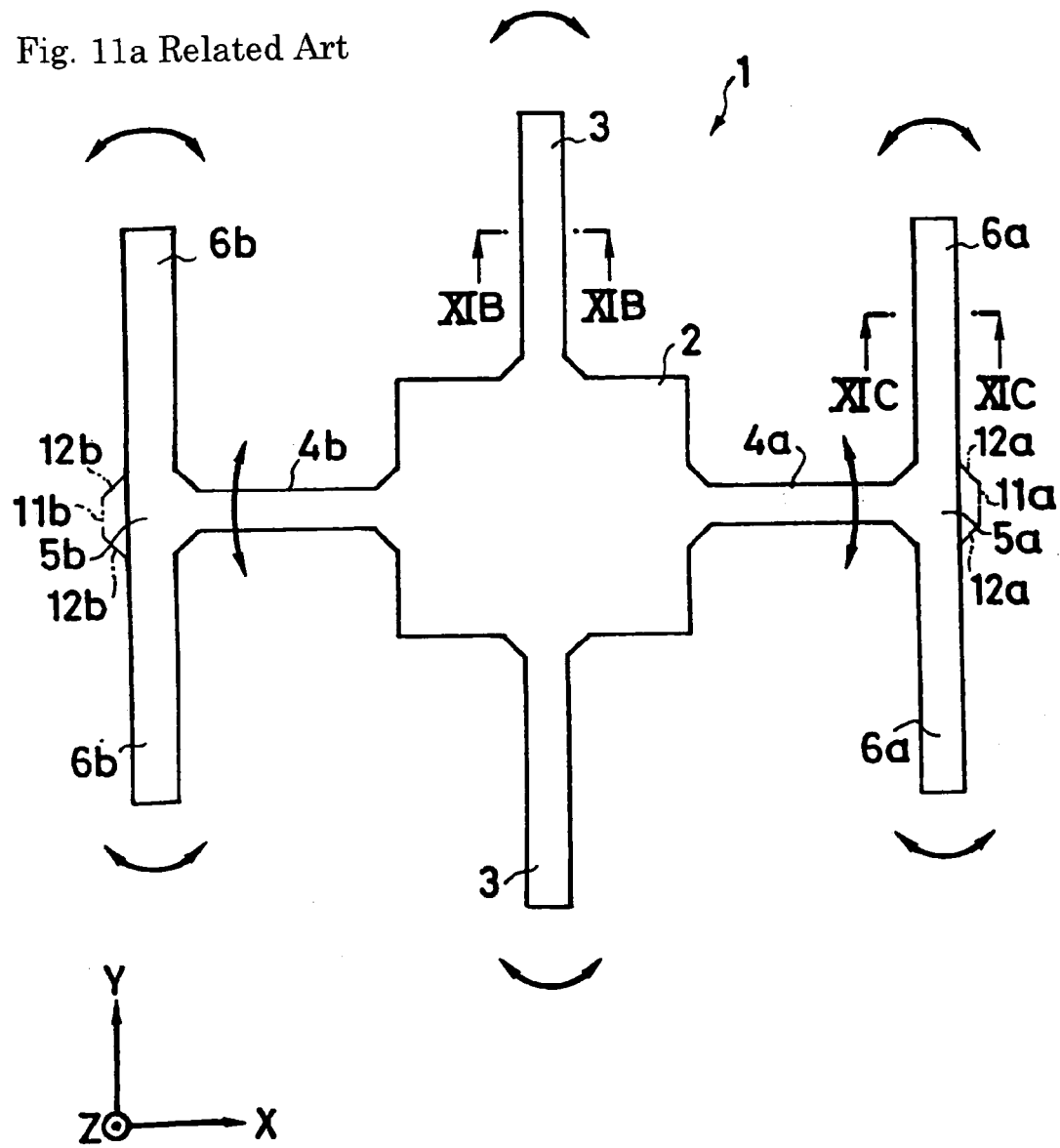
FIG. 11(A) is a plan view schematically showing a conventional piezoelectric vibration gyro element.
Figure 11B:
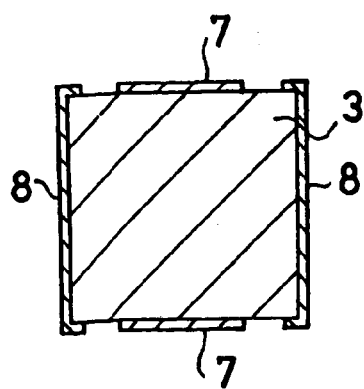
FIG. 11(B) is a sectional view of the driving resonant arm of the gyro element along the line XIB—XIB in FIG. 11(A)
Figure 11C:
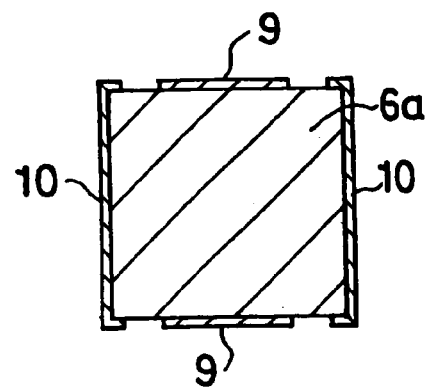
FIG. 11(C) is an enlarged view of the detecting resonant arm of the gyro element along the line XIC—XIC in FIG. 11(A)
Figure 12:
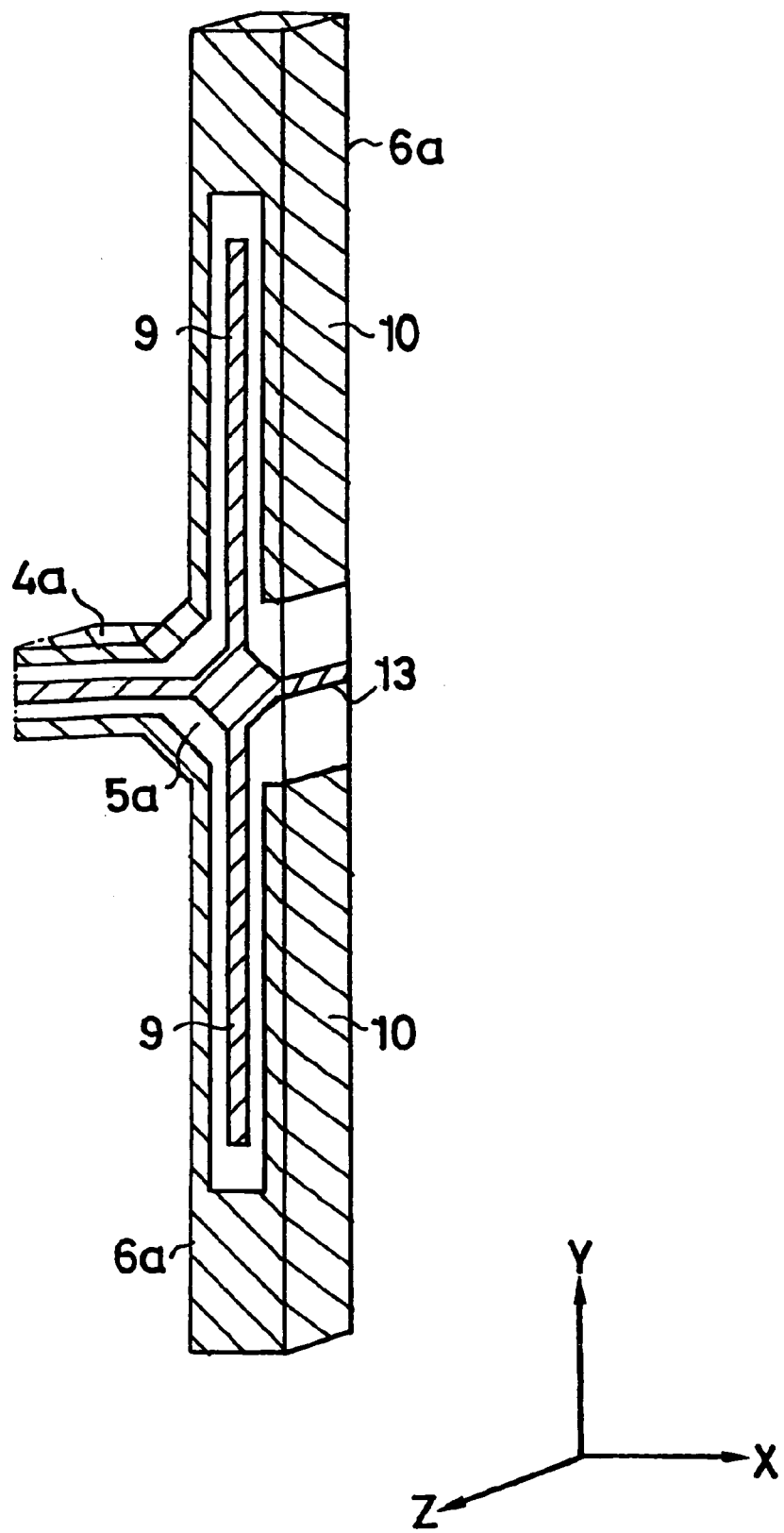
FIG. 12 is a perspective view showing the driving resonant arms and the driving electrodes on one side shown in FIG. 11.

Preferred embodiments of the invention will now be described with reference to the accompanying drawings.

FIG. 1 schematically shows a piezoelectric vibration gyro element 21 according to the invention. The piezoelectric vibration gyro element 21 includes a pair of detecting resonant arms 23, 23 serving as a detecting resonator and extending from the center of upper and lower sides of a substantially square-shaped central supporting part 22 upward and downward. The piezoelectric vibration gyro element 21 also includes a pair of connecting arms 24a, 24b serving as a driving resonator and extending from the center of right and left sides of the central supporting part 22 to the right and left in a direction perpendicular to the detecting resonant arms. The piezoelectric vibration gyro element 21 also can include right and left pairs of driving resonant arms 26a, 26a, 26b, 26b extending from bases 25a, 25b, which are the far ends of the connecting arms, upward and downward in a direction perpendicular to the connecting arms, that is, in parallel with the detecting resonant arms. The piezoelectric vibration gyro element 21 has a structure symmetric about the Y-axis running through the center of the detecting resonant arms and the X-axis running through the center of the connecting arms.

The piezoelectric vibration gyro element 21 can also include extension parts 27a, 27b extending from the bases 25a, 25b, which are the far ends of the connecting arms 24a, 24b, in the directions that each of the connecting arms extends. The extension parts 27a, 27b have flat surfaces 28a, 28a, 28b, 28b on both sides along the direction in which the connecting arms extend, that is, in parallel with the connecting arms. The extension parts are preferably one-third as long as the connecting arms at most, so that they have substantially no influence on flexure and vibrating of the resonant arms and the connecting arms.

The bases 25a, 25b are provided with tapered parts 29a, 29b, 30a, 30b at each junction between the driving resonant arm and the adjacent connecting arm and between the driving resonant arm and the adjacent extension part. These tapered parts are preferably formed symmetrically about the connecting arms and the extension parts, and moreover, about the driving resonant arms. The central supporting part 22 is also provided with tapered parts 31a, 31b, 32a, 32b at each corner in which the detecting resonant arm and the connecting arm join. These tapered parts are preferably formed symmetrically about the detecting resonant arms and the connecting arms.

Provided on the front and back main surfaces and side surfaces of the detecting resonant arms 23, 23 are first and second detecting electrodes 33, 34 as shown in FIGS. 2(A), 2(B), and 3. The first and second detecting electrodes 33, 34 are coupled to electrode pads 33a, 34a, respectively, that are provided on the front surface of the central supporting part 22. The first detecting electrodes 33, 33 on the front and back main surfaces are electrically coupled each other by a wiring running on the side surface of the central supporting part 22 that will be described in greater detail below.

Provided on the front and back main surfaces and side surfaces of the driving resonant arms 26a, 26b are first and second driving electrodes 35, 36 as shown in FIGS. 2(A), 2(C), and 3. The first driving electrode 35 of one driving resonant arm 26a is coupled to an electrode pad 38 on the front surface of the central supporting part 22 by a wiring 37a on the front main surface of the adjacent connecting arm 24a, and is also coupled to the second driving electrode 36 of the other driving resonant arm 26b by a wiring 39b on the back main surface and side surface of the connecting arm 24b on the opposite side. Meanwhile, the first driving electrode 35 of the other driving resonant arm 26b is coupled to an electrode pad 40 on the front surface of the central supporting part 22 by a wiring 39a on the front main surface of the adjacent connecting arm 24b, and is also coupled to the second driving electrode 36 of the one driving resonant arm 26a by a wiring 37b on the back main surface and side surface of the connecting arm 24a on the opposite side.

FIG. 4 shows one of the extension parts 27a, 27b. An electrode film 41 is provided to the end surface of the extension part 27a (27b), intersecting both of the flat surfaces 28a, 28a (28b, 28b), so as to pass across the end surface in its thickness direction. A wiring 42 including the electrode film 41 is provided to the base 25a (25b) so as to join its front and back main surfaces, and electrically couples the first driving electrodes 35, 35 on the front and back main surfaces of the driving resonant arm. Meanwhile, the second driving electrode 36 is provided on the side surface of each driving resonant arm to reach the tapered parts 29a, 29a (29b, 29b). Since both of the flat surfaces 28a, 28a (28b, 28b) of the extension part have no electrode film, the second driving electrode 36 and the electrode film 41, and namely the wiring 42, are completely separated by the flat surfaces, so there is no possibility of causing a short circuit.

The substantially square-shaped central supporting part 22 has on its side surfaces a flat surface 43 whose face is perpendicular to the direction in which the detecting resonant arms 23, 23 extend and a flat surface 44 whose face is in parallel with this direction, except for the tapered parts 31a, 31a, 32a, 32b, as shown in FIG. 5(A). Provided on the flat surface 43 is an electrode film 45 passing across part of the surface in its thickness direction. A wiring 46 including the electrode film 45 is provided to the central supporting part 22 so as to join its front and back main surfaces, and electrically couples the first driving electrodes 33, 33 on the front and back main surfaces of the detecting resonant arm. Meanwhile, the second detecting electrode 34 is provided on the side surface of each detecting resonant arm to reach the tapered parts 31a, 31b. Since the electrode film 45 is located sufficiently apart from the adjacent tapered part 31a, the second detecting electrode 34 and the wiring 46 are completely separated by the flat surface 43 having no electrode film, so there is no possibility of causing a short circuit.

FIG. 5(B) shows a modification of the central supporting part 22 according to the embodiment. The central supporting part 22 of this modification has tapered parts 47a, 47b that are formed by straight cutting out the corners of the square. Provided on the tapered part 47a is an electrode film 48 passing across the part in its thickness direction. A wiring 49 including the electrode film 48 joining the front and back main surfaces electrically couples the first driving electrode 33a on each of the front and back main surfaces of the detecting resonant arm. Here, since the flat surfaces 43, 44 adjacent to the tapered part 47a have no electrode film, the second detecting electrode 34 and the wiring 49 are completely separated, so there is no possibility of causing a short circuit.

The driving resonant arms 26a, 26b flexural vibrate in the XY plane including their main surfaces in the direction indicated by the arrow A in FIG. 1 when a predetermined amount of alternating current is applied to the driving electrodes. When the piezoelectric vibration gyro element 21 rotates in the XY plane, i.e., around the Z axis, in this state, the Coriolis force arises along the longitudinal direction of each driving resonant arm back and forth alternately. This makes the connecting arms 24a, 24b also flexural vibrate in the XY plane in the direction indicated by the arrow B. The force is transmitted via the central supporting part 22, and thereby making the detecting resonant arms 23, 23 also flexural vibrate in the XY plane in the direction indicated by the arrow C. The detecting electrodes detect the distortion of piezoelectric material due to the detecting resonant arms' flexure and vibrating and generate a signal. With a resonance frequency obtained by electrically processing the signal, the rotation and angle velocity in the plane around the Z axis are measured.

The piezoelectric vibration gyro element 21 of the abovementioned embodiment is made out of a crystal wafer integrally by photo etching. A material of the piezoelectric vibration gyro element used for the invention, it should be understood however, that it is not limited to crystal. Other widely known piezoelectric materials, such as lithium niobate, lithium tantalate, a solid solution of lithium niobate and lithium tantalate, lithium borate, and langasite can also be used for making the gyro element. In this embodiment, a crystal wafer whose main surface is on the XY plane and thickness is along the Z axis, which is typically called a Z substrate, is employed.

First, the piezoelectric vibration gyro element 21 is shaped out of a crystal wafer. This is done by forming a corrosion resisting film on the whole surface of the crystal wafer, printing the outer shape of the piezoelectric vibration gyro element 21 on the film by known photo etching, and wet etching the exposed crystal surface. Then an electrode film is provided on the whole surface of the shaped crystal element piece, and a photoresist film is deposited on top of that. The electrode film is formed, for example, by spattering or depositing chrome on the crystal surface and then gold on top of that.

Next, an exposure mask is placed on the photoresist film. Then patterns of the electrodes and wirings are printed by irradiating the mask with ultraviolet light. FIGS. 6, 7(A), and 7(B) show an exposure process especially for providing the first and second driving electrodes 35, 36 to the driving resonant arm 26a (26b) separated from the electrode film 41 and the wiring 42 to the extension part 27a (27b). As shown in the drawings, after depositing an electrode film 51 and then a photoresist film 52 on the whole surface of a shaped crystal element piece 50, an exposure mask 53 is provided on one of its main surface (on the front main surface according to this embodiment).

The exposure mask 53 is made of a thin transparent glass plate as widely known. On its surface, a light-shielding part 54 is provided by depositing a metal film of chrome, for example. The light-shielding part 54 is formed so as to completely cover regions in the photoresist film 52 for all the electrodes and wirings to be provided on the main surfaces and side surfaces of the crystal element piece 50, including the first and second driving electrodes, the electrode film 41 and the wiring 42. The light-shielding part 54 is so formed that the flat surfaces 28a, 28a (28b, 28b) of the extension part 27a (27b) are transparent through the exposure mask 53 as shown in FIG. 6. However, it is unnecessary for the tapered parts 29a, 29a (29b, 29b) to have such a light-shielding part, since there is no need to remove the electrode 36 there.

Light sources 55, 55 are positioned above the exposure mask 53 sandwiching the extension part 27a (27b). The front main surface and side surfaces of the crystal element piece 50 are irradiated with ultraviolet light from the light sources for a predetermined period of time. Each of the light sources is positioned above so as to emit ultraviolet light to the main surface of the crystal element piece 50 from the above with a predetermined angle and to the side surface of the extension part 27a (27b) in a direction perpendicular to its extension direction. In this way, the front main surface and side surfaces of the crystal element piece 50 are exposed to light simultaneously and evenly in a single step of the exposure process. In particular, accurate exposure for necessary parts is achieved by irradiating the side surfaces of the extension part 27a (27b) with substantially perpendicular light, making it possible to separate electrodes with highly accurate dimensions and shapes.

Then, the crystal element piece 50 is exposed to light from behind in the same manner. In this way, the exposure of the photoresist film 52, provided on the whole surface of the crystal element piece 50, to light is completed by two steps of the exposure process in this embodiment. In another embodiment, with exposure masks placed on the front and back main surfaces of the crystal element piece 50, the front and back main surfaces are irradiated with light all at once. In this case, the exposure of the photoresist film on the whole surface of the crystal element piece to light is completed by one step of the exposure process.

Subsequently, the photoresist film 52 is developed, and its exposed area is removed. Then, with its unexposed area remaining unremoved, the electrode film 51 is exposed. The electrode film 51 is exposed as shown in FIGS. 8(A) and (B), after the photoresist film 52 is removed from the flat surfaces 28a, 28a (28b, 28b) of the extension part 27a (27b). Then, the electrode film 51 that is exposed is removed using an appropriate etchant, and a desired electrode separation process follows this. Subsequently, the remaining photoresist film is completely removed, which completes the piezoelectric vibration gyro element 21 of this embodiment. The flat surfaces 28a, 28a (28b, 28b) of the extension part 27a (27b) being completely removed as shown in FIGS. 9(A) and (B), the electrode film 41 on the end surface of the extension part is completely separated from the second driving electrode 36 reaching the tapered parts 29a, 29a (29b, 29b).

Although electrode separation in the central supporting part 22 is not shown in the drawings, the photoresist film is thoroughly exposed to light in each one step of exposure from the front and back surfaces of the crystal element piece 50 like the case with the extension parts 27a, 27b as mentioned above referring to FIGS. 6 through 9. Each light source is positioned so as to emit ultraviolet light to the main surface of the crystal element piece 50 from the above with a predetermined angle and to the side surfaces of the central supporting part 22 in a direction perpendicular to the flat surface 43. An exposure mask used here has a light-shielding part so as to completely cover a region for the electrode film 45 to protect from light, while expose other regions of the flat surface 43 to light. Thus, the electrode film is thoroughly removed from the flat surface 43 other than the region for the electrode film 45, making the wiring 46 and the second driving electrode 36 be completely separated.

As for the central supporting part 22 of the modification shown in FIG. 5(B), an exposure mask having a light-shielding part so as to completely cover the tapered part 47a at the corner of the square to protect from light, while exposing the flat surfaces 43, 44 to light can be used. Likewise, each light source is positioned so as to emit ultraviolet light to the crystal element piece 50 from the above with a predetermined angle in a direction perpendicular to the flat surface 43. Consequently, while the flat surfaces 43, 44 are thoroughly exposed to light and the electrode film on them are completely removed, the electrode film 48 is completely separated as the tapered part 47a is hard to be exposed by nature.

FIG. 10 schematically shows a piezoelectric vibration gyro sensor 60 in which the piezoelectric vibration gyro element 21 according to the embodiment is built. The piezoelectric vibration gyro sensor 60 is mounted with the piezoelectric vibration gyro element 21 and an integrated circuit (IC) chip 62 for driving and controlling the gyro element in a package 61. The package 61 includes a base 63 and a metal lid 65. The base 63 has a rectangular box structure with a plurality of ceramic thin plates multilayered in it. The IC chip 62 is fixed to the bottom of an empty space in the box structure. The metal lid 65 is sealed on the top of the package 61 with a sealing 64 therebetween for airtight packaging. The package 61 is evacuated, so that the piezoelectric vibration gyro element 21 will not be prevented from flexure and vibrating.

The piezoelectric vibration gyro element 21 is fixed in a horizontal position using a metal tape Automated Bonding tape 67 above a circuit substrate 66 laid out horizontally and directly above the IC chip 62. One end of the tape Automated Bonding tape 67 is joined and fixed to the circuit substrate 66, and the tape Automated Bonding tape 67 bends so as to extend obliquely upward. With the tape Automated Bonding tape 67 bending so as to be in parallel with the lower surface of the central supporting part 22 of the piezoelectric vibration gyro element 21, the other end of the tape is electrically coupled to the electrode pads 33*a*, 33*a*, 34*a*, 34*b*, 38, 40 for driving signals, detecting signals, and grounding provided on the lower surface of the central supporting part 22. The circuit substrate 66 is coupled to an external electrode that is outside of the IC chip 62 and the package 61 by an internal wiring of the package 61. By applying a predetermined driving voltage from an external circuit and a power source that are coupled by the external electrode, the piezoelectric vibration gyro element 21 oscillates accurately at a predetermined frequency.

According to another embodiment, the piezoelectric vibration gyro element 21 is joined by using an insulating epoxy bonding for example, so that the lower surface of the central supporting part 22 is directly adhered to the upper surface of the IC chip 62. With this configuration, the height of the piezoelectric vibration gyro sensor can be kept low. In this case, the electrode pads of the central supporting part 22 and the electrode pad on the IC chip 62 are electrical coupled by using, for example, wire bonding with the electrode pads located on the upper surface of the central supporting part 22, or face-down bonding with the electrode pads located on the lower surface of the central supporting part 22.

By a further alternative embodiment, the lid 65 can be made of a transparent material, such as a glass plate. This makes it possible to partly remove the electrodes of the resonant arms, which is called trimming, by irradiating the lid 65 with a laser from outside, for example, after sealing the package 61. Thus, it is possible to adjust frequencies more accurately.

It should be understood that the invention is not limited to the preferred embodiments, and examples mentioned above, and various modifications and changes can be made within the spirit and scope of the invention. For example, the piezoelectric vibration gyro element 21 may include a longitudinal groove on each of the upper and lower surfaces of the detecting resonant arms and the driving resonant arms in which an electrode to be provided on the main surfaces is formed in order to significantly improve field efficiency for lowering CI values on the driving side and to reliably and accurately detect oscillations on the detecting side.

What is claimed is:

1. A piezoelectric vibration gyro element, comprising:
a pair of detecting resonant arms extending from a central supporting part to both sides and including first detecting electrodes each on front and back main surfaces and second detecting electrodes each on side surfaces;
a pair of connecting arms extending from the central supporting part to both sides in a direction perpendicular to the detecting resonant arms;
two pairs of driving resonant arms extending from each far end of the connecting arms to both sides in a direction perpendicular to the connecting arms and including first driving electrodes each on front and back main surfaces and second driving electrodes each on side surfaces;
an extension part extending from each far end of the connecting arms in a direction in which each of the connecting arms extends; and
a flat surface included in side surfaces of the extension part extending to both sides along a direction in which an end surface of the extension part extends and perpendicular to a direction in which the driving resonant arms extend;
the first driving electrodes on the front and back main surfaces of the driving resonant arms being electrically coupled to each other by a wiring pattern passing across the end surface of the extension part in a thickness direction and joining the end surface and front and back main surfaces of the extension part;
the piezoelectric vibration gyro element further comprising:
a first flat surface having face that is perpendicular to a direction in which the detecting resonant arms extend, a second flat surface having face that is in parallel with a direction in which the detecting resonant arms extend, and a tapered part obliquely intersecting the first and second flat surfaces, both of the flat surfaces and the tapered part included in side surfaces of the central supporting part; and
a tapered part obliquely intersecting a flat surface of a driving resonant arm and a flat surface of the extension part, the flat surface of the driving resonate arm extending in a direction in which the driving resonate arms extend, the flat surface of the extension part extending in a direction in which the extension part and the connecting arms extend,
the first detecting electrodes on the front and back main surfaces of the detecting resonant arms being electrically coupled to each other by a wiring pattern passing across the tapered part in a thickness direction and joining the front and back main surfaces of the central supporting part.

2. The piezoelectric vibration gyro element according to claim 1, further comprising:
a first flat surface having face that is perpendicular to a direction in which the detecting resonant arms extend and a second flat surface having face that is in parallel with a direction in which the detecting resonant arms extend, both of the flat surfaces included in side surfaces of the central supporting part;
the first detecting electrodes on the front and back main surfaces of the detecting resonant arms being electrically coupled to each other by a wiring pattern passing across the first flat surface in a thickness direction and joining the front and back main surfaces of the central supporting part.

3. The piezoelectric vibration gyro element according to claim 1, further comprising:
a tapered part provided to each far end of the connecting arms at each junction between the driving resonant arm and the connecting arm that are adjacent each other and between the driving resonant arm and the extension part that are adjacent each other; and
a tapered part provided at each side surface of the central supporting part in which the detecting resonant arm and the connecting arm join.

4. A piezoelectric vibration gyro sensor, comprising:
the piezoelectric vibration gyro element according to claim 1;

a semiconductor integrated circuit element that drives and controls the piezoelectric vibration gyro element; and a package containing the piezoelectric vibration gyro element and the semiconductor integrated circuit element.

5. A method for manufacturing a piezoelectric vibration gyro element, comprising:

forming an outer shape of a piezoelectric element piece including a pair of detecting resonant arms extending from a central supporting part to both sides, a pair of connecting arms extending from the central supporting part to both sides in a direction perpendicular to the detecting resonant arms, two pairs of driving resonant arms extending from each far end of the connecting arms to both sides in a direction perpendicular to the connecting arms, an extension part extending from each far end of the connecting arms in a direction in which each of the connecting arms extends, and a flat surface included in side surfaces of the extension part extending to both sides along a direction in which an end surface of the extension part extends and perpendicular to in a direction in which the driving resonant arms extend;

forming an electrode film on whole surfaces of the piezoelectric element piece and applying a photoresist film on top of the electrode film;

exposing the photoresist film to light from one main surface of the piezoelectric element piece and from the other main surface of the piezoelectric element piece;

removing the photoresist film that is exposed to light so as to expose the electrode film and removing the exposed electrode film by wet etching for electrode separation; and forming a tapered part that obliquely intersects a flat surface of a driving resonate arm and a flat surface of the extension part, the flat surface of the driving resonate arm extending in a direction in which the driving resonate arms extend, the flat surface of the extension part extending in a direction in which the extension part and the connecting arms extend, the method forming first detecting electrodes each on front and back main surfaces of the detecting resonant arms and second detecting electrodes each on side surfaces of the detecting resonant arms, forming first driving electrodes each on front and back main surfaces of the driving resonant arms and second driving electrodes each on side surfaces of the driving resonant arms, removing the electrode film from the flat surface of the extension part, and providing the end surface and the extension part with a wiring pattern passing across the end surface of the extension part in a thickness direction and joining front and back main surfaces of the extension part so as to electrically couple the first driving electrodes each on the front and back main surfaces of the driving resonant arms.

6. The method for manufacturing a piezoelectric vibration gyro element according to claim 5, the exposure being done from above in a direction perpendicular to the flat surface of the extension part, that is a direction in which the extension part extends, and with a given angle to the main surfaces of the driving resonant arms.

7. The method for manufacturing a piezoelectric vibration gyro element according to claim 6, side surfaces of the central supporting part of the piezoelectric element piece having a first flat surface whose face is perpendicular to a direction in which the detecting resonant arms extend and a second flat surface whose face is in parallel with a direction in which the detecting resonant arms extend, and the exposure being done from the above in a direction perpendicular to the first flat surface of the central supporting part and with a given angle to main surfaces of the central supporting part so as to remove the electrode film from the first and second flat surfaces and form a wiring pattern passing across the side surface of the central supporting part in a thickness direction and joining the front and back main surfaces of the central supporting part for electrically coupling the first detecting electrodes each on the front and back main surfaces of the detecting resonant arms.

8. The method for manufacturing a piezoelectric vibration gyro element according to claim 5, the photoresist film of the piezoelectric element piece being exposed to light from both front and back surfaces simultaneously.

9. The method for manufacturing a piezoelectric vibration gyro element according to claim 5, the outer shape of the piezoelectric element piece being formed by wet etching a quartz crystal wafer.

* * * * *